(12) United States Patent
Solo et al.

(10) Patent No.: US 8,041,464 B2
(45) Date of Patent: Oct. 18, 2011

(54) NETWORK RADIALITY IN RECONFIGURATION OF A RADIAL POWER DISTRIBUTION SYSTEM USING A MATRIX-STRUCTURED KNOWLEDGE-BASED SYSTEM

(75) Inventors: Ashu M. G. Solo, Saskatoon (CA); Robert John Sarfi, Denver, CO (US); Ramakrishna Gokaraju, Saskatoon (CA)

(73) Assignees: Ashu M. G. Solo, Saskatoon, Sask. (CA); Robert J. Sarfi, Denver, CO (US)

( * ) Notice: Subject to any disclaimer, the term of this patent is extended or adjusted under 35 U.S.C. 154(b) by 1022 days.

(21) Appl. No.: 11/978,587

(22) Filed: Oct. 30, 2007

(65) Prior Publication Data
US 2008/0288118 A1 Nov. 20, 2008

Related U.S. Application Data

(60) Provisional application No. 60/855,047, filed on Oct. 30, 2006.

(51) Int. Cl.
*G05D 11/00* (2006.01)
*G06F 1/28* (2006.01)
*H02J 3/14* (2006.01)

(52) U.S. Cl. ........ 700/286; 700/295; 709/201; 709/220; 703/18; 345/644

(58) Field of Classification Search .................. 700/286, 700/295–298; 345/644; 376/245, 254; 702/182; 709/201, 204, 220, 249; 725/79
See application file for complete search history.

(56) References Cited

U.S. PATENT DOCUMENTS

| | | | | |
|---|---|---|---|---|
| 6,181,984 B1 * | 1/2001 | Sawa et al. | ..................... | 700/286 |
| 6,310,929 B1 * | 10/2001 | Hirukawa | ..................... | 376/245 |
| 6,408,041 B2 * | 6/2002 | Hirukawa | ..................... | 376/254 |
| 6,571,152 B1 * | 5/2003 | Sawa et al. | ..................... | 700/286 |
| 7,394,472 B2 * | 7/2008 | Oliveira et al. | ............... | 345/645 |
| 7,519,506 B2 * | 4/2009 | Trias | .............................. | 702/182 |
| 2001/0036242 A1 * | 11/2001 | Hirukawa | ..................... | 376/245 |
| 2007/0052705 A1 * | 3/2007 | Oliveira et al. | ............... | 345/423 |
| 2009/0228154 A1 * | 9/2009 | Trias | .............................. | 700/295 |

\* cited by examiner

*Primary Examiner* — Albert DeCady
*Assistant Examiner* — Douglas S Lee

(57) ABSTRACT

A knowledge-based system is defined that ensures network radiatity during reconfiguration of a power distribution system. Network radiality heuristics idenufy a pair of switching operations that will preserve radiality. A line section table specifies the line section identifier, start bus, end bus, line section type, and switch existence for each line section in the network. A bus table identifies the line section that supplies the bus and those line sections that are fed by the bus for each bus in the network. A matrix-structured knowledge base with five distinct rule bases is used. The line section and bus tables must be updated after any switching operations are enacted. Extensive simulations of the knowledge-based system revealed that a solution was found in a time-efficient manner. This knowledge-based system enhances network reliability and hence prevents power outages. Also, the knowledge-based system can be used to preserve radiality during optimization of power distribution system operations for different objectives.

14 Claims, 3 Drawing Sheets

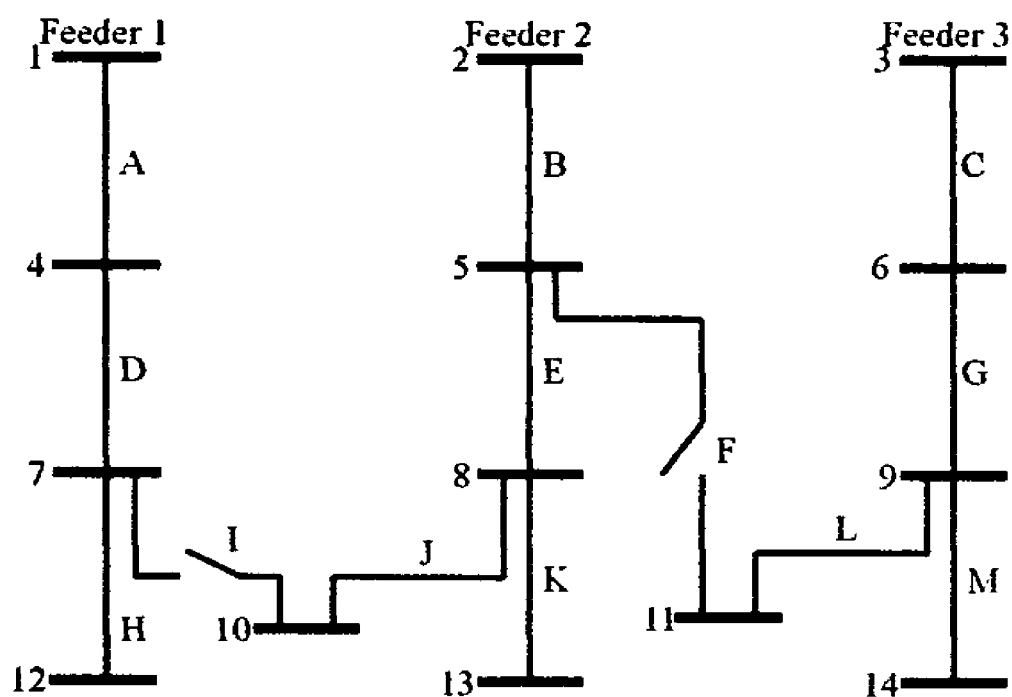
Fig. 1. Sample Network.

$$\begin{bmatrix} \text{Rule Base A} & \\ \text{Rule Base B} & \text{Rule Base D} \\ \text{Rule Base C} & \text{Rule Base E} \end{bmatrix}$$

Fig. 2. Matrix-Structured Radiality Knowledge Base

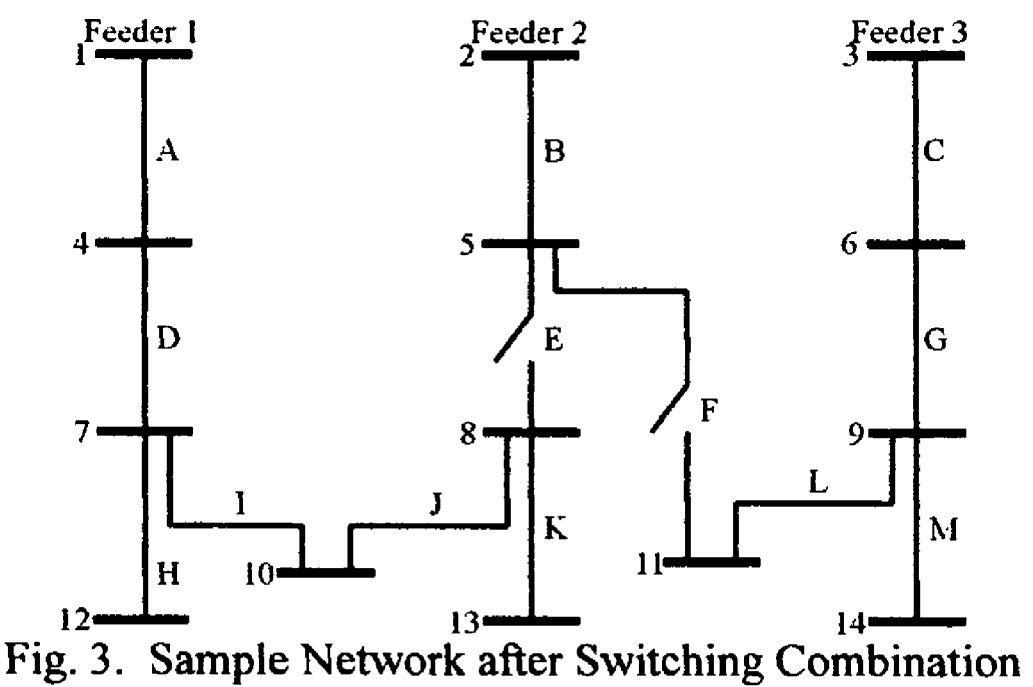
Fig. 3. Sample Network after Switching Combination

NETWORK RADIALITY IN RECONFIGURATION OF A RADIAL POWER DISTRIBUTION SYSTEM USING A MATRIX-STRUCTURED KNOWLEDGE-BASED SYSTEM

This application claims benefit of our provisional patent application 60/855,047 filed Oct. 30, 2006

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

This invention relates to utilizing a knowledge-based system to ensure network radiality during reconfiguration of a radial power distribution system.

2. Description of Prior Art

Previous methods for distribution system reconfiguration employed one of three possible techniques to ensure that network radiality is preserved:
1. Constraints are included that ensure a bus's supply is equal to its demand.
2. The product of power flows for line sections about a loop is equal to 0. Also, the product of binary variables representing switch status, such that 1 is closed and 0 is open, for line sections about a loop is equal to 0.
3. A branch exchange is performed. Closing one line section results in the opening of another.

The first two methods can only be implemented with numerical methods. It is necessary to ensure that the supply and demand of each bus is equal, but solution through this technique is inefficient when employed in conjunction with a knowledge-based method. It would be necessary to calculate a power flow equation including losses for every bus in the network each time a switching operation is examined. Therefore, it is somewhat impractical to implement these techniques.

The third method, which involves a branch exchange, can be somewhat inefficient in terms of solution time during optimization of power distribution system operations if not initialized by a good starting point, but can be employed in knowledge-based methods. Roytelman et al proposed a simple formulation that assumes all line sections are equipped with a tie or sectionalizer. Their algorithm only determines which neighbor to open next if a previously open switch is closed. Other previously proposed methods assume all line sections are equipped with a switch; this is an oversimplification of the reconfiguration problem. Loosely incorporating the work of Roytelman et al, the knowledge-based system improves the branch exchange method previously applied to the reconfiguration problem. Line sections equipped with a switch are recognized and a required switch closing, associated with a switch opening, is found or a required switch opening, associated with a switch closing, is found. Radiality is ensured, even though the system is initially represented as a meshed network.

3. Objects and Advantages

Accordingly besides the objects and advantages described in this patent, some objects and advantages of the matrix-structured knowledge-based system for network radiality are The intelligent system is implemented with knowledge-based methods and without numerical methods. This reduces solution time, which is important due to time constraints in distribution system reconfiguration.

The intelligent system does not assume that all line sections are equipped with a tie or sectionalizer.

The intelligent system does not assume that all line sections are equipped with a switch. The line section table keeps track of which line sections are equipped with a switch and whether there is an open or closed switch on that line section.

The intelligent system does not assume all line sections are the same. The line section table keeps track of whether a line section is a source, terminal, or intermediate node. This affects switching decisions because the intelligent system should not isolate a terminal node or not use all sources to supply the network.

The intelligent system finds an initially open switch to close to assume the load transfer necessitated by a switch opening. Alternatively, the intelligent system finds an initially closed switch to open because of the load transfer necessitated by a switch closing.

The intelligent system does a breadth first search in finding a switch to open because this increases the likelihood of finding a corresponding switch to open in greater proximity of the switch being closed. Alternatively, the intelligent system does a breadth first search in finding a switch to close because this increases the likelihood of finding a corresponding switch to close in greater proximity of the switch being opened.

The intelligent system checks that all buses of the subsystem are supplied.

The intelligent system checks for the formation of isolated loops.

The intelligent system for network radiality can be used during distribution system reconfiguration immediately after failure of power system components, during system optimization procedures, during network maintenance, and after power outages.

The intelligent system enhances network reliability and can prevent power outages, which cost individuals and organizations tremendous productivity, time, and money.

Still further objects and advantages will become apparent from a consideration of the ensuing description and drawings.

SUMMARY

The invention is a method for radial power distribution systems of using a knowledge-based system for maintaining radiality. This is done by finding an initially closed switch to open because of the load transfer necessitated by an initially open switch being closed, by finding an initially open switch to close to assume the load transfer necessitated by an initially closed switch being opened, by finding an initially closed switch to open because of the load transfer necessitated by a short circuit due to a power system component failure, and by finding an initially open switch to close to assume the load transfer necessitated by an open circuit due to power system component failure.

BRIEF DESCRIPTION OF THE DRAWING

FIG. 1 shows the connectivity features for the sample system;

FIG. 2 shows the structure of the knowledge base;

FIG. 3 shows the sample network after the switching combination.

DESCRIPTION OF PREFERRED EMBODIMENT AND ITS OPERATIONS

The most frequently used design for power distribution systems is the radial distribution system because it is the simplest and least expensive system to build. A radial distribution system has power lines extending radially from a common substation with customer loads coming off at single nodes along the line. A radial distribution system has only one power source for a group of customers, so a power failure will interrupt power to all customers along an entire line. Power can only flow in one direction from the source to the load. Network radiality refers to maintaining this power flow to all customer loads on a line. Ring distribution systems, also known as loop distribution systems, and network distribution systems are more expensive to build, but are more reliable because customers have more than one available power source. However, due to high capital and conversion costs, the majority of utility power distribution systems in service and under construction are radial in nature.

The primary objective of a radial distribution network operator is to ensure a reliable and continuous supply of power to customers. Line current and fault current levels should not increase beyond system design parameters.

A knowledge-based system is defined that ensures network radiality during reconfiguration of a power distribution system. Distribution system reconfiguration occurs immediately after failure of power system components, during system optimization procedures, during network maintenance, and after power outages. The extremely powerful CLIPS language was used in development of the knowledge-based system.

Network radiality heuristics identify a pair of switching operations that will preserve radiality. Line sections equipped with a switch are recognized and a required switch closing, associated with a switch opening, is found. Radiality is ensured, even though the system is initially represented as a meshed network. This matrix-structured knowledge-based system constitutes a significant advancement over previous approaches.

1. Line Section and Bus Tables

Two tables are employed by network radiality heuristics: a line section and a bus table. These line section and bus tables embody much more information than search procedures described by other researchers. The additional information quickens search procedures by considering complex switching operations instead of merely closing a switch and opening its nearest neighbor.

The line section table specifies the line section identifier, start bus, end bus, line section type, and switch existence for each line section in the network. The line section type is particularly useful in reducing the search space, as it ensures that the line section examined has a switch. Three different types of line sections are defined in the line section type column:

1. source
2. terminal
3. intermediate

Source line sections do not have a supply line, but have a demand line. Terminal line sections have a supply line, but do not have a demand line. Intermediate line sections have both a supply line and demand line. There are three possible entries in the switch column for each line section:

1. open switch
2. closed switch
3. none (line section not equipped with switchgear)

The bus table identifies the line section that supplies the bus and those line sections that are fed by the bus for each bus in the network. An entry of "none" in the supply line column indicates that the node is a substation. An entry of "none" in the demand line column indicates a terminal node.

The line section and bus tables are essential to the maintenance of a radial configuration. Following any switching operations, these tables are updated to reflect the changes. The line section table in Table 1 and bus table in Table 2 show the connectivity features for the sample system of FIG. 1.

2. Network Radiality Knowledge Base

The authors define a matrix-structured knowledge base as a knowledge base with more than one distinct rule bases, each of which is only activated when certain conditions are met. This knowledge-based system for network radiality has five distinct rule bases in a matrix-structured knowledge base. The individual rule bases are referred to as rule base A, rule base B, rule base C, rule base D, and rule base E. FIG. 2 illustrates the structure of the knowledge base.

Rule base A has five rules used to determine which other rule bases to activate. For a particular switching combination, either rule bases B and C are used or rule bases D and E are used. Rule bases B and C are used when an initially open switch is closed to assume the load transfer that would be necessitated by a switch opening. Rule bases D and E are used when an initially closed switch is opened because of the load transfer that would be necessitated by a switch closing. In the rule bases, it is assumed that all source line sections are already closed in a distribution network so the network is supplied by all available substations.

Rule base B has six rules used in considering whether to open a particular switch. There may be no choice in a line section being open circuited after failure of power system components. If this is the case, then the rules of rule base B are skipped entirely. Rule base C has eight rules used during a breadth first search in finding a corresponding initially open switch to close to maintain radiality and in disqualifying search paths.

Rule base D has five rules used in determining whether to close a particular switch. There may be no choice in a line section being short circuited after failure of power system components. If this is the case, then the rules of rule base D are skipped entirely. Rule base E has seven rules used during a breadth first search in finding a corresponding initially closed switch to open to maintain radiality and in disqualifying search paths.

In rule base A, if a terminal line section switch is being closed, then there is no load transfer and a corresponding switch does not need to be opened to maintain radiality, so rule A-1 activates no other rule bases. If there is an open circuit due to the failure of a power system component, then rule A-2 activates rule base C to find a corresponding switch to close because of the load transfer necessitated by an open circuit. If there is a short circuit due to the failure of a power system component, then rule A-3 activates rule base E to find a corresponding switch to open because of the load transfer necessitated by a short circuit. If a switch is being opened and a corresponding switch closed to maintain radiality because of the load transfer necessitated by the switch opening, then rule A-4 activates rule base B followed by rule base C. If a switch is being closed and a corresponding switch opened to maintain radiality because of the load transfer necessitated by the switch closing, then rule A-5 activates rule base D followed by rule base E.

In rule base B, if a line section has already been used in distribution system reconfiguration during an interval, then any further switching operations involving the line section are prevented by rule B-1. Source line sections are promptly discarded from consideration by rule B-2 because a switch opening on a source line section will prevent a feeder from being used. Furthermore, terminal line sections are promptly discarded from consideration by rule B-3 because a switch opening on a terminal line section will leave a bus isolated. Line sections with an open switch are disqualified as candidate line sections by rule B-4. Line sections with no switch are disqualified as candidate line sections by rule B-5. Rule B-6 is passed if the line section has not been disqualified by rules B-1 through B-5 and has an initially closed switch.

Every switch has an upstream (supply) side and downstream (demand) side. When opening a switch, its upstream terminal switch will remain supplied with electricity. However, for the switch's downstream node, it is necessary to transfer the load to another substation. Once a potential switch opening has been identified, several simple steps are followed to identify the switch, if one exists, that must be closed.

The connectivity of downstream nodes in the bus table is examined. The supply line of the downstream node no longer acts as a supply. By examining demand lines using network radiality rules, it is determined if the switch to close is in the current search path or another search path. The search path followed by the algorithm is retained in memory to update entries of the line section and bus tables if an operation is enacted. This search path is called the trace-back path.

A breadth first search is performed to determine what line sections are connected to the downstream node. In a depth first search, once a potential path is identified, it is traced until a path is found to be acceptable or unacceptable. It is better to do a breadth first search than a depth first search because a breadth first search increases the likelihood of finding a corresponding switch to close in greater proximity of the switch being opened. This leaves more line sections available for further distribution system reconfiguration operations.

During the breadth first search for an initially open switch to close, rule C-1 disqualifies line sections already used for distribution system reconfiguration during an interval and search paths with these line sections. Rule C-2 disqualifies source line sections as candidates and search paths with source line sections. Rule C-3 disqualifies terminal line sections as candidates and search paths with terminal line sections. Line sections with a closed switch are disqualified as candidate line sections by rule C-4, but search paths with closed switches are not disqualified. Line sections with no switch are disqualified as candidate line sections by rule C-5, but search paths with no switch are not disqualified. Rule C-6 is passed if the line section is not disqualified by rules C-1 through C-5 and has an initially open switch. Rule C-7 checks that the initially open switch has supply and rule C-8 checks for the formation of isolated loops.

The breadth first search starts from the downstream node of the line section being cut and continues until a line section that meets all criteria has been found. If no viable line section is found during examination of the line sections connected to the downstream node of the switch being cut, then the knowledge-based system will continue its breadth first search by sequentially examining line sections connected to the end bus of each line section with no switch or a closed switch. If a switching combination is identified that will preserve network radiality, then the line section and bus tables are updated to ensure that network modifications are considered during subsequent analysis.

In rule base D, if a line section has already been used in distribution system reconfiguration during an interval, then any further switching operations involving the line section are prevented by rule D-1. Line sections with a closed switch are disqualified as candidate line sections by rule D-2. Line sections with no switch are disqualified as candidate line sections by rule D-3. Rule D-4 is passed if the line section has not been disqualified by rules D-1 through D-3 and has an initially open switch. Rule D-5 checks that the initially open switch has supply.

Every switch has an upstream (supply) side and downstream (demand) side. When closing a switch, its upstream switch will remain supplied with electricity. However, the switch's downstream node will be supplied by two sources if there is not a corresponding switch opening. Once a potential switch closing is identified, several simple steps are followed to identify the switch, if one exists, that must be opened.

The connectivity of downstream nodes in the bus table is examined. By examining demand lines using network radiality rules, it is determined if the switch to open is in the current search path or another search path. The search path followed by the algorithm is retained in memory to update entries of the line section and bus tables if an operation is enacted. This search path is called the trace-back path.

A breadth first search is performed to determine what line sections are connected to the downstream node. In a depth first search, once a potential path is identified, it is traced until a path is found to be acceptable or unacceptable. It is better to do a breadth first search than a depth first search because a breadth first search increases the likelihood of finding a corresponding switch to open in greater proximity of the switch being closed. This leaves more line sections available for further distribution system reconfiguration operations.

During the breadth first search for an initially open switch to close, rule E-1 disqualifies line sections already used for distribution system reconfiguration during an interval and search paths with these line sections. Rule E-2 disqualifies source line sections as candidates and search paths with source line sections. Rule E-3 disqualifies terminal line sections as candidates and search paths with terminal line sections. Rule E-4 disqualifies line sections with an open switch and search paths with an open switch. Rule E-5 disqualifies line sections with no switch, but these search paths are not disqualified. Rule E-6 is passed if the line section is not disqualified by rules E-1 through E-5 and has an initially open switch. Rule E-7 checks for the formation of isolated loops.

The breadth first search starts from the downstream node of the line section being closed and continues until a line section that meets all criteria has been found. If no viable line section is found during examination of the line sections connected to the downstream node of the switch being closed, then the knowledge-based system will continue its breadth first search by sequentially examining line sections connected to the end bus of each line section with no switch. If a switching combination is identified that will preserve network radiality, then the line section and bus tables are updated to ensure that network modifications are considered during subsequent analysis.

The sample system of FIG. 1 and its corresponding line section table in Table I and bus table in Table 2 are used to explain each of the rules in rule bases A, B, C, D, and E.

2.1 Rule Base A for Secondary and Tertiary Rule Base Activation

Rule A-1: Terminal Line Section Switch Closure

The closing of a terminal line section does not require another switch to be opened to maintain network radiality. No load transfer is required by such an operation. A terminal node cannot be supplied by any other line section, so this switching operation should be accepted without any need to activate other rule bases.

> If a terminal line section switch is being closed, then a corresponding switch should not be opened and none of the rule bases should be activated.

Rule A-2: Open Circuit Due to Failure of Power System Component Necessitates a Switch Closing

When there is an open circuit due to the failure of a power system component, a corresponding switch should be closed to assume the load transfer necessitated by this open circuit. There is no choice about this open circuit, so there is no reason to activate rule base B, but rule base C is activated to find an initially open switch to close.

> Else if there is a failure of power system components that is open circuiting a line section, then activate rule base C to find a corresponding switch to close.

Rule A-3: Short Circuit Due to Failure of Power System Component Necessitates a Switch Opening

When there is a short circuit due to the failure of a power system component, a corresponding switch should be opened because of the load transfer necessitated by this short circuit. There is no choice about this short circuit, so there is no reason to activate rule base D, but rule base E is activated to find an initially closed switch to open.

> Else if there is a failure of power system components that is short circuiting a line section, then activate rule base E to find a corresponding switch to open.

Rule A-4: Initially Open Switch Is Closed to Assume the Load Transfer That Would Be Necessitated by a Switch Opening

A switch opening requires a corresponding initially open switch to be closed to assume the load transfer that would be necessitated by the switch opening. Rule base B considers if it is okay to open a particular switch and rule base C finds a corresponding initially open switch to close.

> Else if a switch is being opened and a corresponding switch closed to maintain radiality, then activate rule base B followed by rule base C.

Rule A-5: Initially Closed Switch is Opened Because of the Load Transfer That Would Be Necessitated by a Switch Closing

A switch closing on a source or intermediate line section requires a corresponding initially closed switch to be opened because of the load transfer that would be necessitated by the switch closing. Rule base D considers if it is okay to close a particular switch and rule base E finds a corresponding initially closed switch to open.

> Else if a switch is being closed and a corresponding switch opened to maintain radiality, then activate rule base D followed by rule base E.

2.2 Rule Base B for an Initially Closed Switch to Open

Rule B-1: Switch Previously Used During an Interval in Distribution System Reconfiguration

If a line section has already been used for a switching operation during an interval, then any further proposed switching operations involving the line section should be discarded. For example, if line section I were previously closed during an hourly optimization process, then it would be ruled out as a candidate for opening by subsequent operations within that interval.

> If the line section was previously used in distribution system reconfiguration during an interval, then the line section is not a candidate to open.

Rule B-2: Source Line Section

If a line section connects a bus to a substation, then that line section should not be a candidate to open during distribution system reconfiguration. The network should be supplied by all substations to maximize the continuity of supply in case of a transformer failure. A single substation cannot be expected to have adequate capacity to supply the entire network without going into an emergency condition. All available substations should be employed to balance transformer and feeder loading. Line sections A, B, and C will not be considered viable to open because they are source line sections.

> Else if the line section is a source line section, then the line section is not a candidate to open.

Rule B-3: Terminal Line Section

If the line section being examined leads to a terminal node that cannot be supplied by another line section, then it should be disqualified from being a candidate line section. Rule B-3 will disqualify opening line sections H, K, and M because they are terminal line sections.

> Else if the line section is a terminal line section, then the line section is not a candidate to open.

Rule B-4: Open Switch

Any line section with an already open switch is obviously not a candidate to be opened. Line sections F and I will be disqualified as candidates to open because they already have open switches.

> Else if the line section has an already open switch, then the line section is not a candidate to open.

Rule B-5: No Switch

A line section can only be employed in distribution system reconfiguration if it has a switch. For example, if line section D of the sample system is examined, rule B-5 will disqualify it as a candidate to open because it has no switch, as indicated in Table 1.

> Else if the line section does not have a switch, then the line section is not a candidate to open.

Rule B-6: Initially Closed Switch

This rule is passed if the line section has not been discarded by rules B-1 through B-5 and has an initially closed switch. Line sections D, E, J, and L could pass this rule as they have initially closed switches.

> Else if the line section has a closed switch, then the line section is a candidate to open.

2.3 Rule Base C for an Initially Open Switch to Close to Maintain Radiality

Rule C-1: Switch Previously Used During an Interval in Distribution System Reconfiguration

Like rule B-1, this rule disqualifies line sections previously used for a switching operation during an interval from being involved in further switching operations, but also disqualifies any search path including a line section previously used in distribution system reconfiguration during an interval.

> If the line section was previously used in distribution system reconfiguration during an interval, then the line section is not a candidate to close and this search path is disqualified.

Rule C-2: Source Line Section

It is assumed that all source line sections are already closed in a distribution network so the network is supplied by all available substations. The search path is disqualified from further consideration because there are no more line sections along this search path.

> Else if the line section is a source line section, then the line section is not a candidate to close and this search path is disqualified.

Rule C-3: Terminal Line Section

The downstream node of a terminal line section is a terminal node. Therefore, closing a terminal line section will not result in the load transfer necessitated by a switch being opened and this line section is not a candidate to close. Furthermore, this search path is disqualified from further consideration because there are no line sections connected to a terminal node.

Else if the line section is a terminal line section, then the line section is not a candidate to close and this search path is disqualified.

Rule C-4: Closed Switch

Any line section with an already closed switch is obviously not a candidate to be closed, but this search path is not disqualified by rule C-4. Line sections D, E, and J will be disqualified as candidates because they have closed switches.

Else if the line section has a closed switch, then the line section is not a candidate to close, but this search path is not disqualified.

Rule C-5: No Switch

Like rule B-5, a line section with no switch cannot be a candidate. However, this search path is not disqualified.

Else if the line section does not have a switch, then the line section is not a candidate to close, but this search path is not disqualified.

Rule C-6: Initially Open Switch

As previously described, the line section to be cut is represented by an upstream node and downstream node. The upstream node is supplied by a line section other than the one to be cut. From the downstream node, a breadth first search is performed until an initially open switch is located on those search paths not disqualified by rules C-1 through C-3. For example, if the switch on E is opened, the search eventually traces a path to I. Line section I has an initially open switch that can be closed; consequently, a potential switching combination has been identified.

Else if the line section has an initially open switch, then a potential switching combination has been identified.

Rule C-7: Supply to the Initially Open Switch

When opening a switch on a line section and closing a corresponding initially open switch, all buses of the subsystem should be supplied. Rule C-7 checks if the start bus of the initially open switch has supply. Assume a potential switching combination is identified in which line section E is opened and line section I is closed. The start bus of I is bus 7. The transfer of supply from bus 5 to bus 7 by the switching combination is considered by rule C-7. Table 2 indicates that bus 7 is supplied by line section D, which is not cut. Therefore, the start bus of the initially open switch has supply.

If the start bus of the initially open switch has supply, then a potential switching combination has been identified.

Rule C-8: Formation of an Isolated Loop

Once an initially open switch is identified, it is necessary to examine the trace-back path to ensure that no isolated loops are formed with the closure of that initially open switch. To check that no loops are formed, the source line sections of the initially open switch are followed until a source is identified. This very fast procedure is not computationally intensive. If one of the buses on the trace-back path is crossed when tracing the source path of the open switch, then it is assumed that a loop has been formed and the switching operation is not viable. For example, if bus 4 were directly connected to bus 10 through another line section, then an isolated loop would be formed.

If the source trace from the start bus of the initially open switch does not cross the trace-back path, then a successful switching combination has been identified.

2.4 Rule Base D for an Initially Open Switch to Close

Rule D-1: Switch Previously Used During an Interval in Distribution System Reconfiguration If a line section has already been used for a switching operation during an interval, then any further proposed switching operations involving the line section should be discarded. For example, if line section I were previously opened during an hourly optimization process, then it would be ruled out as a candidate for closing by subsequent operations within that interval.

If the line section was previously used in distribution system reconfiguration during an interval, then the line section is not a candidate to close.

Rule D-2: Closed Switch

Any line section with an already closed switch is obviously not a candidate to be closed. Line sections D, E, J, and L will be disqualified as candidates to close because they already have closed switches.

Else if the line section has an already closed switch, then the line section is not a candidate to close.

Rule D-3: No Switch

A line section can only be employed in distribution system reconfiguration if it has a switch. For example, if line section G of the sample system is examined, rule D-3 will disqualify it as a candidate to close because it has no switch, as indicated in Table 1.

Else if the line section does not have a switch, then the line section is not a candidate to close.

Rule D-4: Initially Open Switch

This rule is passed if the line section has not been discarded by rules D-1 through D-3 and has an initially open switch. Line sections F and I could pass this rule as they have initially open switches.

Else if the line section has an open switch, then the line section is a candidate to close.

Rule D-5: Supply to the Initially Open Switch

When closing a switch on a line section and opening a corresponding initially closed switch, all buses of the subsystem should be supplied. Rule D-5 checks if the start bus of the initially closed switch has supply. Assume a potential switching closing is identified in which line section I is closed. The start bus of I is bus 7. Table 2 indicates that bus 7 is supplied by line section D, which is not cut. Therefore, the start bus of the initially open switch has supply.

If the start bus of the initially open switch does not have supply, then the line section is not a candidate to close.

2.5 Rule Base E for an Initially Closed Switch to Open to Maintain Radiality

Rule E-1: Switch Previously Used During an Interval in Distribution System Reconfiguration Like rule D-1, this rule disqualifies line sections previously used for a switching operation during an interval from being involved in further switching operations, but also disqualifies any search path including a line section previously used in distribution system reconfiguration during an interval.

If the line section was previously used in distribution system reconfiguration during an interval, then the line section is not a candidate to open and this search path is disqualified.

Rule E-2: Source Line Section

If a line section connects a bus to a substation, then that line section should not be a candidate to open during distribution system reconfiguration. The network should be supplied by all substations to maximize the continuity of supply in case of a transformer failure. A single substation cannot be expected to have adequate capacity to supply the entire network without going into an emergency condition. All available substations should be employed to balance transformer and feeder loading. Line sections A, B, and C will not be considered viable to open because they are source line sections. The search path is disqualified from further consideration because there are no more line sections along this search path.

Else if the line section is a source line section, then the line section is not a candidate to open and this search path is disqualified.

Rule E-3: Terminal Line Section

If the line section being examined leads to a terminal node that cannot be supplied by another line section, then it should be disqualified from being a candidate line section. Rule E-3 will disqualify opening line sections H, K, and M because they are terminal line sections. The search path is disqualified from further consideration because this is a terminal node.

Else if the line section is a terminal line section, then the line section is not a candidate to open and this search path is disqualified.

Rule E-4: Open Switch

Any line section with an already open switch is obviously not a candidate to be opened and this search path is disqualified by rule E-4. Line sections F and I will be disqualified as candidates because they already have open switches. The search path is disqualified because there is already an open circuit along this path.

Else if the line section has an open switch, then the line section is not a candidate to open and this search path is disqualified.

Rule E-5: No Switch

Like rule D-3, a line section with no switch cannot be a candidate. However, this search path is not disqualified.

Else if the line section does not have a switch, then the line section is not a candidate to open, but this search path is not disqualified.

Rule E-6: Initially Closed Switch

As previously described, the line section to be cut is represented by an upstream node and downstream node. The upstream node is supplied by a line section other than the one to be cut. From the downstream node, a breadth first search is performed until an initially closed switch is located on those search paths not disqualified by rules E-1 through E-4. For example, if the switch on I is closed, the search eventually traces a path to E. Line section E has an initially closed switch that can be opened; consequently, a potential switching combination has been identified.

Else if the line section has an initially closed switch, then a potential switching combination has been identified.

Rule E-7: Formation of an Isolated Loop

Once an initially closed switch is identified, it is necessary to examine the trace-back path to ensure that no isolated loops are formed with the opening of the initially closed switch. To check that no loops are formed, the source line sections of the initially open switch are followed until a source is identified. This very fast procedure is not computationally intensive. If one of the buses on the trace-back path is crossed when tracing the source path of the closed switch, then it is assumed that a loop has been formed and the switching operation is not viable. For example, if bus 5 were directly connected to bus 10 through another line section, then an isolated loop would be formed.

If the source trace from the start bus of the initially open switch does not cross the trace-back path, then a successful switching combination has been identified.

3. An Example Using Network Radiality Heuristics

The following example thoroughly demonstrates how the network radiality heuristics interact and how the trace-back path is defined. The sample system of FIG. 1 and its corresponding line section table in Table 1 and bus table in Table 2 are used. In this example, there is a switch opening and a corresponding switch closing to assume the load transfer necessitated by the switch opening. Therefore, rule A-4 activates rule base B to check if it is okay to open a particular switch followed by rule base C to find a corresponding switch to close to maintain radiality.

A list of potential line sections to be cut is ranked as follows: C, K, G, and E. This list could have been generated using a heuristic preprocessor during reconfiguration for loss reduction.

Line section C is examined first. In an ideal situation, with the opening of C, a complementary switch to close would be identified. However, rule B-2 disqualifies C as a viable option because it is a source line section, and the next candidate switch is examined.

Line section K is the next best option on the starting list, so its line section type is read from the line section table. Rule B-3 disqualifies K because it is a terminal line section.

Line section G is the next best entry on the starting list, but rule B-5 disqualifies G from being a candidate because it is not equipped with a switch.

The next and last possible candidate is line section E. Rules B-1 through B-5 are activated and the candidate is not disqualified for any reason. Rule B-6 is passed because E has an initially closed switch.

The line section table indicates that E is connected to bus 5 and bus 8. The bus table indicates that bus 8 is supplied by E and bus 5 is supplied by another line section. Therefore, bus 5 is identified as the upstream node and bus 8 is identified as the downstream node. Because bus 5 is the upstream bus to E, its supply does not need to be examined. To preserve radiality, the knowledge-based system must determine how to switch the buses isolated by the opening of E to another feeder. Bus 10 and bus 13 become isolated by this opening. A breadth first search is performed to determine what line sections are connected to the downstream node, bus 8.

Line section J is examined first. This has a closed switch, so it is disqualified by rule C-4. However, if no other candidate with an initially open switch is found after the first level of the breadth first search is completed, the line sections connected to the end bus of J will be considered by the knowledge-based system during the breadth first search.

The bus table indicates that K is the next line section connection to bus 8, but rule C-3 disqualifies K because it is a terminal line section. No information regarding this selection is stored in a trace-back path.

The breadth first search proceeds by determining if another line section is connected to bus 8. As no other line sections are connected to bus 8, the secondary level of connectivity is examined for line section J. Although J was not a successful candidate, this search path was not disqualified. The only path not disqualified is from bus 8 to bus 10 via J Line section J is terminated by bus 10. The trace-back path is now bus 8 to bus 10.

By examining the line sections connected to bus 10 in the line section table, it is found that only I is connected. Line section I has an initially open switch. Hence, I is not disqualified by rules C-1 through C-5 and rule C-6 is satisfied.

Rule C-7 checks that there is supply to the start bus of I, bus 7. The bus table indicates that bus 7 is supplied by line section D, which has not been previously employed in a switching operation. Bus 7 is added to the trace-back path, which is now from bus 8 through bus 10 to bus 7.

Now that a candidate switching combination has been identified, it is necessary to activate rule C-8 to search for isolated loops. Bus 7 is supplied by D. Line section D is connected to bus 4, which is connected to source line section A. A review of the trace-back path reveals that no isolated loop has been formed. None of the buses on the path to the source are included within the trace-back path.

FIG. 3 shows the sample network after the switching combination. The line section and bus tables are updated after each switching operation is enacted. Tables 3 and 4 show the line section table and bus table after the switching combination in this example has been enacted.

Before the switching operations, bus 13 is supplied by the second feeder in the sample network through line sections B, X, and K After the switching operations, bus 13 is supplied by the first feeder through line sections A, D, I, J, and K This example merely demonstrates the search procedure for line sections in distribution system reconfiguration. A heuristic preprocessor can be used to obtain a good starting point during system optimization. Under normal circumstances, selection of a good starting point using will not result in such a high proportion of candidate switches being rejected during system optimization. If network radiality heuristics find an associated closure for an initially open switch, then it is necessary to verify that network parameters are not violated by the load transfer associated with the proposed switching combination.

CONCLUSION, RAMIFICATIONS, AND SCOPE

This matrix-structured knowledge-based system for network radiality in a power distribution system is a major improvement over previously published methods. Five comprehensive rule bases are used with a search algorithm and line section and bus tables to preserve radiality during distribution system reconfiguration. After a switch is opened, a corresponding switch is closed to maintain radiality. Alternatively, after a switch is closed, a corresponding switch is opened to maintain radiality.

The intelligent system has the additional advantages in that
  It is implemented with knowledge-based methods and without numerical methods. This reduces solution time, which is important due to time constraints in distribution system reconfiguration.
  It does not assume that all line sections are equipped with a tie or sectionalizer.
  It does not assume that all line sections are equipped with a switch. The line section table keeps track of which line sections are equipped with a switch and whether there is an open or closed switch on that line section.
  It does not assume all line sections are the same. The line section table keeps track of whether a line section is a source, terminal, or intermediate node. This affects switching decisions because the intelligent system should not isolate a terminal node or not use all sources to supply the network.
  It does a breadth first search in finding a switch to open because this increases the likelihood of finding a corresponding switch to open in greater proximity of the switch being closed. Alternatively, the intelligent system does a breadth first search in finding a switch to close because this increases the likelihood of finding a corresponding switch to close in greater proximity of the switch being opened.
  It checks that all buses of the subsystem are supplied.
  It checks for the formation of isolated loops.

The knowledge-based system can be used immediately after failure of power system components, during system optimization procedures, during network maintenance, and after power outages. The intelligent system enhances network reliability and can prevent power outages, which cost individuals and organizations tremendous productivity, time, and money.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

TABLE 1

Line Section Table for Sample Network

| Line | Start Bus | End Bus | Line Section Type | Switch |
| --- | --- | --- | --- | --- |
| A | 1 | 4 | source | none |
| B | 2 | 5 | source | none |
| C | 3 | 6 | source | none |
| D | 4 | 7 | intermediate | none |
| E | 5 | 8 | intermediate | closed |
| F | 5 | 11 | intermediate | open |
| G | 6 | 9 | intermediate | none |
| H | 7 | 12 | terminal | none |
| I | 7 | 10 | intermediate | open |
| J | 8 | 10 | intermediate | closed |
| K | 8 | 13 | terminal | none |
| L | 9 | 11 | intermediate | closed |
| M | 9 | 14 | terminal | none |

TABLE 2

Bus Table for Sample Network

| Bus | Supply Line | Demand Line | Next Line |
| --- | --- | --- | --- |
| 1 | none | A | none |
| 2 | none | B | none |
| 3 | none | C | none |
| 4 | A | D | none |
| 5 | B | E | F |
| 6 | C | G | none |
| 7 | D | H | I |
| 8 | E | J | K |
| 9 | G | L | M |
| 10 | J | none | none |
| 11 | L | none | none |
| 12 | H | none | none |
| 13 | K | none | none |
| 14 | M | none | none |

TABLE 3

Line Section Table for Sample Network after Switching Combination

| Line | Start Bus | End Bus | Line Section Type | Switch |
| --- | --- | --- | --- | --- |
| A | 1 | 4 | source | none |
| B | 2 | 5 | source | none |
| C | 3 | 6 | source | none |
| D | 4 | 7 | intermediate | none |
| E | 5 | 8 | intermediate | open |
| F | 5 | 11 | intermediate | open |
| G | 6 | 9 | intermediate | none |
| H | 7 | 12 | terminal | none |
| I | 7 | 10 | intermediate | closed |
| J | 8 | 10 | intermediate | closed |
| K | 8 | 13 | terminal | none |
| L | 9 | 11 | intermediate | closed |
| M | 9 | 14 | terminal | none |

TABLE 4

Bus Table for Sample Network after Switching Combination

| Bus | Supply Line | Demand Line | Next Line |
|---|---|---|---|
| 1 | none | A | none |
| 2 | none | B | none |
| 3 | none | C | none |
| 4 | A | D | none |
| 5 | B | E | F |
| 6 | C | G | none |
| 7 | D | H | I |
| 8 | J | K | none |
| 9 | G | L | M |
| 10 | I | J | none |
| 11 | L | none | none |
| 12 | H | none | none |
| 13 | K | none | none |
| 14 | M | none | none |

We claim:

1. A method for radial power distribution systems of using a knowledge-based system by a computer processor for finding an initially closed switch to open because of the load transfer necessitated by an initially open switch being closed or for finding an initially open switch to close to assume the load transfer necessitated by an initially closed switch being opened or for finding an initially closed switch to open because of the load transfer necessitated by a short circuit due to a power system component failure or for finding an initially open switch to close to assume the load transfer necessitated by an open circuit due to power system component failure, such that radiality is maintained in a radial power distribution system, comprising the steps of:
   a. determining which other rule bases to activate by the first rule base,
   b. determining whether to open a particular switch by the second rule base if said second rule base is activated by said first rule base,
   c. using a breadth first search in finding a corresponding initially open switch to close by the third rule base if said third rule base is activated by said first rule base,
   d. determining whether to close a particular switch by the fourth rule base if said fourth rule base is activated by said first rule base,
   e. using a breadth first search in finding a corresponding initially closed switch to open by the fifth rule base is said fifth rule base is activated by said first rule base,
   whereby an initially open switch is closed to assume the load transfer necessitated by a switch opening or an initially closed switch is opened because of the load transfer necessitated by a switch closing or an initially open switch is closed to assume the load transfer necessitated by an open circuit due to failure of a power system component or an initially closed switch is opened because of the load transfer necessitated by a short circuit due to failure of a power system component, and whereby radiality is maintained in the power distribution system.

2. The method of claim 1 wherein said first rule base, for determining which other rule bases to activate, comprises the steps of:
   a. activating no other rule base by the first rule of said first rule base if there is no load transfer because a terminal line section is being closed,
   b. activating said second rule base followed by said third rule base by the second rule of said first rule base to consider whether to open a switch and find a corresponding switch to close to maintain radiality because of the load transfer necessitated by the switch opening if an initially closed switch is being opened,
   c. activating said fourth rule base followed by said fifth rule base by the third rule of said first rule base to consider whether to close a switch and find a corresponding switch to open to maintain radiality because of the load transfer necessitated by the switch closing if an initially open switch is being closed.

3. The method of claim 2 with said first rule base, for determining which other rule bases to activate, comprising the additional steps of:
   a. activating said third rule base by the fourth rule of said first rule base to find a corresponding switch to close to maintain radiality if there is a load transfer necessitated by an open circuit due to a failure of a power system component,
   b. activating said fifth rule base by the fifth rule of said first rule base to find a corresponding switch to open to maintain radiality if there is a load transfer necessitated by a short circuit due to a failure of a power system component.

4. The method of claim 1 wherein said second rule base, for determining whether to open a particular switch, comprises the steps of:
   a. preventing any further switching operations involving a line section by the first rule of said second rule base if said line section has already been used in distribution system reconfiguration during an interval,
   b. preventing a switch opening on a source line section by the second rule of said second rule base because opening a switch on said source line section will prevent a feeder from being used,
   c. preventing a switch opening on a terminal line section by the third rule of said second rule base because opening a switch on said terminal line section will leave a bus isolated,
   d. disqualifying a line section with an already open switch from being opened by the fourth rule of said second rule base,
   e. disqualifying a line section with no switch from being opened by the fifth rule of said second rule base,
   f. determining a line section is a candidate to open by the sixth rule of said second rule base if said line section has a closed switch and has not been disqualified by the previous rules of said second rule base.

5. The method of claim 1 wherein said third rule base, for using a breadth first search in finding a corresponding initially open switch to close, comprises the steps of:
   a. disqualifying line sections already used for distribution system reconfiguration during an interval and search paths with these line sections by the first rule of said third rule base,
   b. disqualifying source line sections and search paths with source line sections by the second rule of said third rule base,
   c. disqualifying terminal line sections and search paths with terminal line sections by the third rule of said third rule base,
   d. disqualifying line sections with a closed switch by the fourth rule of said third rule base,
   e. disqualifying line sections with no switch by the fifth rule of said third rule base,
   f. determining a line section might be a candidate to close by the sixth rule of said third rule base if said line section has an open switch and has not been disqualified by the previous rules of said third rule base, g. determining a line section might be a candidate to close by the seventh rule of said third rule base if the start bus of the initially open switch has supply, h. determining that a successful switching combination has been identified by the eighth rule of said third rule base if a source trace from the start bus of the initially open switch does not cross the search path.

6. The method of claim 1 wherein said fourth rule base, for determining whether to close a particular switch, comprises the steps of:

a. preventing any further switching operations involving a line section by the first rule of said fourth rule base if said line section has already been used in distribution system reconfiguration during an interval, b. disqualifying a line section with an already closed switch from being closed by the second rule of said fourth rule base, c. disqualifying a line section with no switch from being closed by the third rule of said fourth rule base, d. determining a line section is a candidate to open by the fourth rule of said fourth rule base if said line section has an open switch and has not been disqualified by the previous rules of said fourth rule base, e. determining a line section is a candidate to close by the fifth rule of said fourth rule base if the start bus of the initially open switch has supply.

7. The method of claim 1 wherein said fifth rule base, for using a breadth first search in finding a corresponding initially closed switch to open, comprises the steps of:

a. disqualifying line sections already used for distribution system reconfiguration during an interval and search paths with these line sections by the first rule of said fifth rule base, b. disqualifying source line sections and search paths with source line sections by the second rule of said fifth rule base, c. disqualifying terminal line sections and search paths with terminal line sections by the third rule of said fifth rule base, d. disqualifying line sections with an open switch and search paths with an open switch by the fourth rule of said fifth rule base, e. disqualifying line sections with no switch by the fifth rule of said fifth rule base, f. determining a line section might be a candidate to open by the sixth rule of said fifth rule base if said line section has a closed switch and has not been disqualified by the previous rules of said fifth rule base, g. determining that a successful switching combination has been identified by the seventh rule of said fifth rule base if a source trace from the start bus of the initially open switch does not cross the search path.

8. A knowledge-based system used by a computer processor with radial power distribution systems for finding an initially closed switch to open because of the load transfer necessitated by an initially open switch being closed or for finding an initially open switch to close to assume the load transfer necessitated by an initially closed switch being opened or for finding an initially closed switch to open because of the load transfer necessitated by a short circuit due to a power system component failure or for finding an initially open switch to close to assume the load transfer necessitated by an open circuit due to power system component failure, such that radiality is maintained in a radial power distribution system, comprising:

a. a line section table, comprising for each line section in the network, entries for a line section identifier, the start bus, the end bus, the line section type, and whether a switch exists, b. a bus table, comprising for each bus in the network, entries for the line section that supplies the bus and those line sections that are fed by the bus, c. a first rule base for determining which other rule bases to activate, d. a second rule base for determining whether to open a particular switch, e. a third rule base for finding a corresponding initially open switch to close using a breadth first search, f. a fourth rule base for determining whether to close a particular switch, g. a fifth rule base for finding a corresponding initially closed switch to open using a breadth first search, whereby an initially open switch is closed to assume the load transfer necessitated by a switch opening or an initially closed switch is opened because of the load transfer necessitated by a switch closing or an initially open switch is closed to assume the load transfer necessitated by an open circuit due to failure of a power system component or an initially closed switch is opened because of the load transfer necessitated by a short circuit due to failure of a power system component, and whereby radiality is maintained in the power distribution system.

9. The knowledge-based system of claim 8 wherein said first rule base, for determining which other rule bases to activate, comprises:

a. a first rule in said first rule base for activating no other rule base if there is no load transfer because a terminal line section is being closed, b. a second rule in said first rule base for activating said second rule base followed by said third rule base to consider whether to open a switch and find a corresponding switch to close to maintain radiality because of the load transfer necessitated by the switch opening if an initially closed switch is being opened, c. a third rule in said first rule base for activating said fourth rule base followed by said fifth rule base to consider whether to close a switch and find a corresponding switch to open to maintain radiality because of the load transfer necessitated by the switch closing if an initially open switch is being closed.

10. The knowledge-based system of claim 9 further including in said first rule base, for determining which other rule bases to activate:

a. a fourth rule in said first rule base for activating said third rule base to find a corresponding switch to close to maintain radiality if there is a load transfer necessitated by an open circuit due to a failure of a power system component, b. a fifth rule in said first rule base for activating said fifth rule base to find a corresponding switch to open to maintain radiality if there is a load transfer necessitated by a short circuit due to a failure of a power system component.

11. The knowledge-based system of claim 8 wherein said second rule base, for determining whether to open a particular switch, comprises:

a. a first rule in said second rule base for preventing any further switching operations involving a line section if said line section has already been used in distribution system reconfiguration during an interval, b. a second rule in said second rule base for preventing a switch opening on a source line section because opening a switch on said source line section will prevent a feeder from being used,
c. a third rule in said second rule base for preventing a switch opening on a terminal line section because opening a switch on said terminal line section will leave a bus isolated,
d. a fourth rule in said second rule base for disqualifying a line section with an already open switch from being opened,
e. a fifth rule in said second rule base for disqualifying a line section with no switch from being opened,
f. a sixth rule in said second rule base for determining a line section is a candidate to open if said line section has a closed switch and has not been disqualified by the previous rules of said second rule base.

12. The knowledge-based system of claim 8 wherein said third rule base, for finding a corresponding initially open switch to close using a breadth first search, comprises:
   a. a first rule in said third rule base for disqualifying line sections already used for distribution system reconfiguration during an interval and search paths with these line sections,
   b. a second rule in said third rule base for disqualifying source line sections and search paths with source line sections,
   c. a third rule in said third rule base for disqualifying terminal line sections and search paths with terminal line sections,
   d. a fourth rule in said third rule base for disqualifying line sections with a closed switch,
   e. a fifth rule in said third rule base for disqualifying line sections with no switch,
   f. a sixth rule in said third rule base for determining a line section might be a candidate to close if said line section has an open switch and has not been disqualified by the previous rules of said third rule base,
   g. a seventh rule in said third rule base for determining a line section might be a candidate to close if the start bus of the initially open switch has supply,
   h. an eighth rule in said third rule base for determining that a successful switching combination has been identified if a source trace from the start bus of the initially open switch does not cross the search path.

13. The knowledge-based system of claim 8 wherein said fourth rule base, for determining whether to close a particular switch, comprises:
   a. a first rule in said fourth rule base for preventing any further switching operations involving a line section if said line section has already been used in distribution system reconfiguration during an interval,
   b. a second rule in said fourth rule base for disqualifying a line section with an already closed switch from being closed,
   c. a third rule in said fourth rule base for disqualifying a line section with no switch from being closed,
   d. a fourth rule in said fourth rule base for determining a line section is a candidate to open if said line section has an open switch and has not been disqualified by the previous rules of said fourth rule base,
   e. a fifth rule in said fourth rule base for determining a line section is a candidate to close if the start bus of the initially open switch has supply.

14. The knowledge-based system of claim 8 wherein said fifth rule base, for finding a corresponding initially closed switch to open using a breadth first search, comprises:
   a. a first rule in said fifth rule base for disqualifying line sections already used for distribution system reconfiguration during an interval and search paths with these line sections,
   b. a second rule in said fifth rule base for disqualifying source line sections and search paths with source line sections,
   c. a third rule in said fifth rule base for disqualifying terminal line sections and search paths with terminal line sections,
   d. a fourth rule in said fifth rule base for disqualifying line sections with an open switch and search paths with an open switch,
   e. a fifth rule in said fifth rule base for disqualifying line sections with no switch,
   f. a sixth rule in said fifth rule base for determining a line section might be a candidate to open if said line section has a closed switch and has not been disqualified by the previous rules of said fifth rule base,
   g. a seventh rule in said fifth rule base for determining that a successful switching combination has been identified if a source trace from the start bus of the initially open switch does not cross the search path.

* * * * *